United States Patent
James

(10) Patent No.: US 6,910,038 B1
(45) Date of Patent: Jun. 21, 2005

(54) METHODS FOR EFFICIENT HOST PROCESSING OF DATA FILES SELECTED FOR RECORDING TO AN OPTICAL DISC MEDIA

(75) Inventor: Kenneth R. James, Sunnyvale, CA (US)

(73) Assignee: Sonic Solutions, Inc., Novato, CA (US)

( * ) Notice: Subject to any disclaimer, the term of this patent is extended or adjusted under 35 U.S.C. 154(b) by 0 days.

(21) Appl. No.: 09/539,482

(22) Filed: Mar. 30, 2000

(51) Int. Cl.[7] .............................................. G06F 17/30
(52) U.S. Cl. ............................. 707/7; 711/4; 711/112; 711/159; 710/52
(58) Field of Search ............................. 707/7; 711/112, 711/159, 4; 710/52; 369/47.54; 600/437

(56) References Cited

U.S. PATENT DOCUMENTS

| | | | | |
|---|---|---|---|---|
| 4,760,526 A | * | 7/1988 | Takeda et al. | 707/7 |
| 5,034,914 A | * | 7/1991 | Osterlund | 710/52 |
| 5,423,018 A | * | 6/1995 | Dang et al. | 711/159 |
| 5,438,674 A | * | 8/1995 | Keele et al. | 711/4 |
| 6,058,091 A | | 5/2000 | Yokota et al. | |
| 6,091,686 A | | 7/2000 | Caffarelli et al. | |
| 6,117,079 A | * | 9/2000 | Brackett et al. | 600/437 |
| 6,118,737 A | | 9/2000 | Hütter | |
| 6,118,754 A | | 9/2000 | Sako et al. | |
| 6,141,489 A | | 10/2000 | Honda | |
| 6,401,169 B1 | * | 6/2002 | McMurdie et al. | 711/112 |
| 6,405,283 B1 | * | 6/2002 | James | 711/112 |
| 2002/0064111 A1 | * | 5/2002 | Horie | 369/47.54 |

* cited by examiner

Primary Examiner—Charles Rones
(74) Attorney, Agent, or Firm—Martine Penilla & Gencarella, LLP

(57) ABSTRACT

Methods for the processing of data files to be recorded on an optical disc are provided. In one example, a method includes the operations of examining a set of files selected to be recorded on an optical disc and then creating a record data structure for each file to be recorded. The files are sequenced in the order in which they will be written to the optical disc by use of pointers to the record data structures. The record data structures are then processed in the writing order creating an ordering data structure for each data file. The ordering data structures are processed to write the set of files onto the optical disc in the writing order. In another example, a computer readable media is provided having program instructions for recording data onto an optical disc. The program instructions process the files to be written by examining the set of files, creating the record data structures, generating the set of pointers associating the record data structures with a writing order, and producing the ordering data structures for each file in the set of files. The program instructions further include the operations of processing the ordering data structures and writing the set of files onto the optical disc in the writing order.

24 Claims, 6 Drawing Sheets

Record Data Structure

```
File parent
Volume label index
File size
Logical block number
File time
File source path
File attributes
Data mode
On removable media
Embedded subheader
Imported
```

Figure 2B

Ordering Data Structure

```
File source path
File start offset
File end offset
File pad to size
```

Figure 3

METHODS FOR EFFICIENT HOST PROCESSING OF DATA FILES SELECTED FOR RECORDING TO AN OPTICAL DISC MEDIA

CROSS REFERENCE TO RELATED APPLICATIONS

This is application is related to U.S. patent application Ser. No. 09/539,481, filed on the same day as the instant application and entitled "METHODS FOR PROCESSING DATA TRANSFERRED TO SYSTEM MEMORY IN PREPARATION FOR RECORDING TO AN OPTICAL DISC." This cross referenced application is hereby incorporated by reference.

BACKGROUND OF THE INVENTION

1. Field of the Invention

The present invention relates generally to the recording of data onto optical discs, and more particularly to a method for more efficiently processing data files selected for recording onto an optical disc.

2. Description of the Related Art

Optical disc storage of data offers relatively high capacity data storage (e.g., approximately 640 Megabytes) on a relatively small and inexpensive optical disc. Optical disc recording commonly involves recording (sometimes referred to as "burning") audio tracks or data files on one or more spiral tracks on an optical disc, which can typically hold between 1 and 99 tracks. The high capacity of optical discs for data storage represents a tremendous advancement over prior art data storage such as the floppy disk which has a capacity of approximately 1.4 Megabytes. Conceivably, the trend will continue and optical discs will offer continually increasing storage capacities on similar sized or even smaller optical discs.

The process of burning data to an optical disc involves several steps between the selection of data files to be recorded and the recording of those files on an optical disc. Selected data files are located, examined, and designated in a recording order in the process of the host system, utilizing a CD recording software application, preparing to record data files to the optical disc media. The process is generally illustrated in FIG. 1.

In FIG. 1, a block diagram 100 illustrates the operations in which data files are processed to be recorded to a CD optical disc. The burn request 104 begins the process and represents a group of one or more data files selected to be written to a CD optical disc. Due to the storage capacity of a CD optical disc, the size of the data files might be quite large, or there may be many smaller files combined to form a large volume of data. However large or small the data files may be, or wherever the data files may be located, the prior art processing of the data in preparation to burn the files to a CD optical disc would next perform two operations simultaneously. The processes of recording order processing 104 and file system creation 106 are performed by the system once the files have been selected for recording. Recording order processing 104 involves the ordering of the selected files in the sequence in which the data files will be burned to the CD optical disc. As is known, the reading and writing of data by a computer occurs within the structure of individual sectors of a certain number of bytes. Files are typically multiple sectors in length, and the recording order processing 104 involves sequencing the files to make the most efficient use of both system resources required for the operation of recording the data files, as well as the available space on the CD on which the data files will be written. During the operation of recording order processing 104 the system generates a list or record of data identifying the data files to be recorded in the order in which they are to be recorded.

At the same time as the recording order processing 104 is occurring, the operation of file system creation 106 is being accomplished. In order to locate, examine, and process the data files for recording, the system maps out an exact location and structure of the data selected for recording. The file system includes the path tables and directory records mapping out each of the data files selected for recording.

The list translation layer 108 generates yet another record of data for the selected data files. In the list translation layer 108, the data records generated by the recording order processing 104 and the file system creation 106 are combined and then unpacked to be sent in individual structures (e.g., file name, directory, path, root, etc.) to the CD recording engine 110. The data records for each data file are assembled in the sequence determined by the recording order processing 104, unpacked into individual structures, and then the individual structures sent to the CD recording engine 110. In the CD recording engine 110, the individual structures are then re-assembled into data records for each file that will be recorded on a CD optical disc. The data records are assembled in the writing order and with the necessary data structures to enable the CD recording engine to locate, open, and read the selected files and then write the data files and, by using the optical CD recording circuitry 112, burn the files to the CD optical disc 114.

It should be appreciated that the prior art process 100 generates multiple lists of data records for each data file selected for burning to a CD optical disc. As is known, each time the list or a variation is generated, the system dedicates and uses system resources (e.g., memory) in the evaluation of the data records and the generation of the lists. In the example of transferring data to a floppy disk with an approximately 1.4 Megabyte capacity, the drain on available system resources is relatively light, but with the ever-increasing capacity of optical discs, and the ever-increasing demand for more efficient and economical utilization of available storage capacity, the conservation of system resources and more efficient processing of data files in preparation for burning to an optical disc is of paramount concern. By way of example, thousands of data files could be selected for burning to a single CD optical disc with a capacity for 640 Megabytes of data. In that case, the prior art would generate no less than four different lists of information about the selected data files, with some of the lists having identical information contained therein. Because the system resources could rapidly become overloaded, some of the data might be lost, the writing process could fail altogether, and the system performance itself could degrade or the system could even crash.

In view of the foregoing, there is a need for a method of processing data files in preparation for recording to an optical disc that minimizes drain on system resources while maximizing efficient and economical use of the storage capacity of an optical disc.

SUMMARY OF THE INVENTION

Broadly speaking, the present invention fills these needs by providing methods for host processing of data files that have been selected for recording on optical disc media. The invention provides methods for processing of files that minimizes the generation of lists that catalog location and attribute information about each data file before writing to the optical disc media. It should be appreciated that the present invention can be implemented in numerous ways, including as a process, an apparatus, a system, a device, a method, or a computer readable media. Several embodiments of the present invention are described below.

In one embodiment, a method for the processing of data files selected for recording on optical disc media is disclosed. The method includes the examining of files that have been selected for recording and creating a record data structure for each file. Pointers are generated to associate each record data structure with a writing order, and each record data structure is processed in the writing order to produce an ordering data structure for each file. The ordering data structures are processed in the writing order to write the selected data files to the optical disc.

In another embodiment, a method for recording data on an optical disc is disclosed. The method includes generating a set of pointers to associate record data structures with a writing order for the data selected to be recorded to an optical disc. The record data structures are processed in the writing order to produce an ordering data structure for each of the files selected for recording, and the ordering data structures are processed to write the selected files onto the optical disc in the writing order.

In still a further embodiment, a computer readable media having program instructions for recording data onto an optical disc is disclosed. The computer readable media includes: (a) program instructions for examining a set of files selected to be recorded on the optical disc; (b) program instructions for creating a record data structure for each file selected to be recorded; (c) program instructions for generating a set of pointers associating each of the record data structures with a writing order; (d) program instructions for processing each of the record data structures in the writing order to produce ordering data structures for each of the data files selected for recording; and (e) program instructions for processing the ordering data structures to write the selected files onto the optical disc in the writing order.

One benefit and advantage of the invention is more efficient processing of data files selected to be recorded to an optical disc media. The more efficient allocation and use of system resources in the processing of data files for recording to optical disc media prevents incomplete data transfer, buffer under-run, or system crash. Another benefit of the present invention is that with more efficient processing of data files, the operation proceeds faster and more reliably. This allows a user to select and record large amounts of data to record to an optical disc media and realize the benefits of the storage capacity of optical disc media without system overload or failure.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2B illustrates a record data structure in accordance with one embodiment of the present invention.

FIG. 3 illustrates an ordering data structure in accordance with one embodiment of the present invention.

DETAILED DESCRIPTION OF THE PREFERRED EMBODIMENTS

An invention is provided for the efficient process of data that is selected to be recorded onto an optical disc media. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
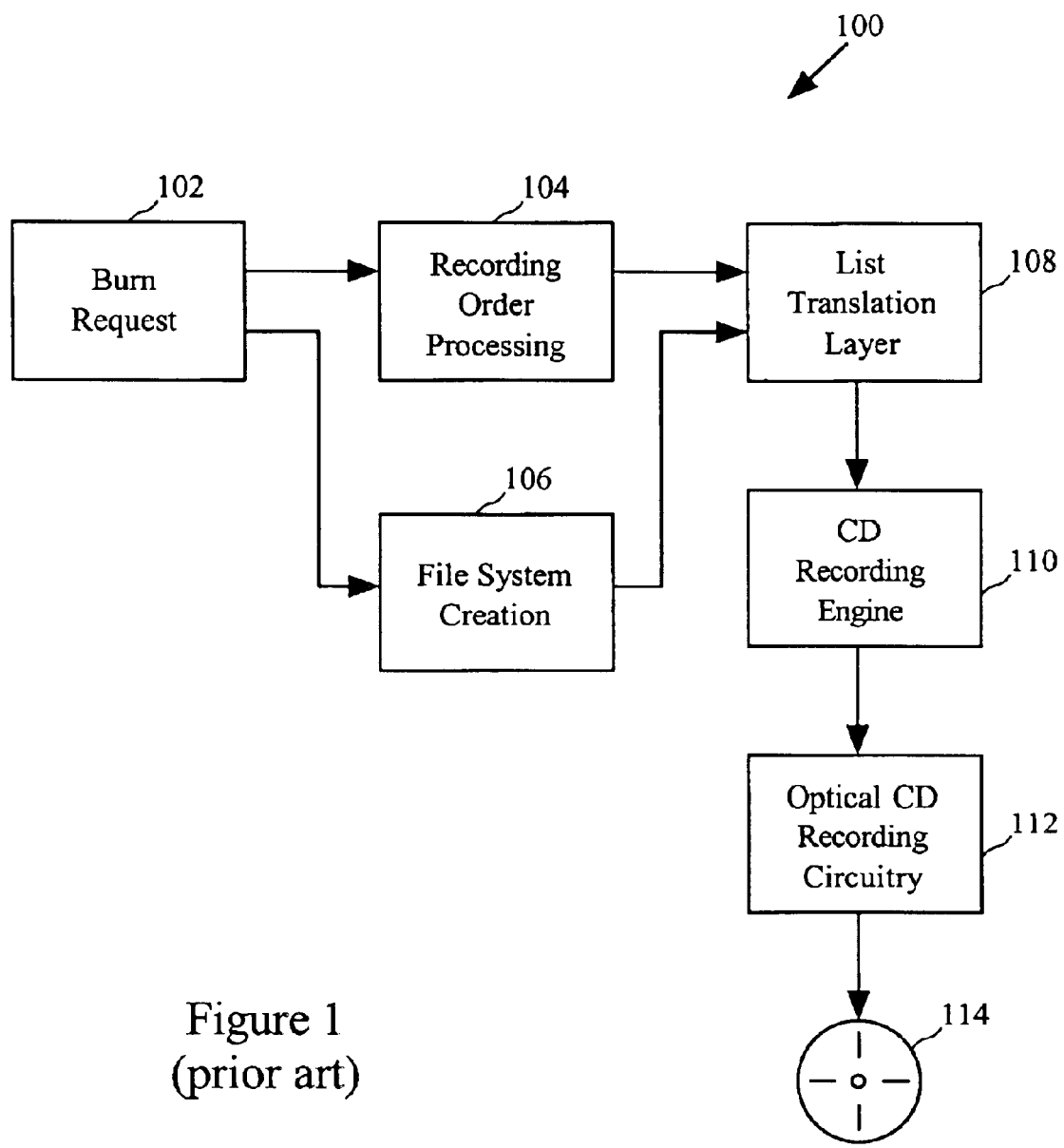
FIG. 1 is a block diagram illustrating the prior art operations in which data files are processed to be recorded to a CD optical disc.
Figure 2A:
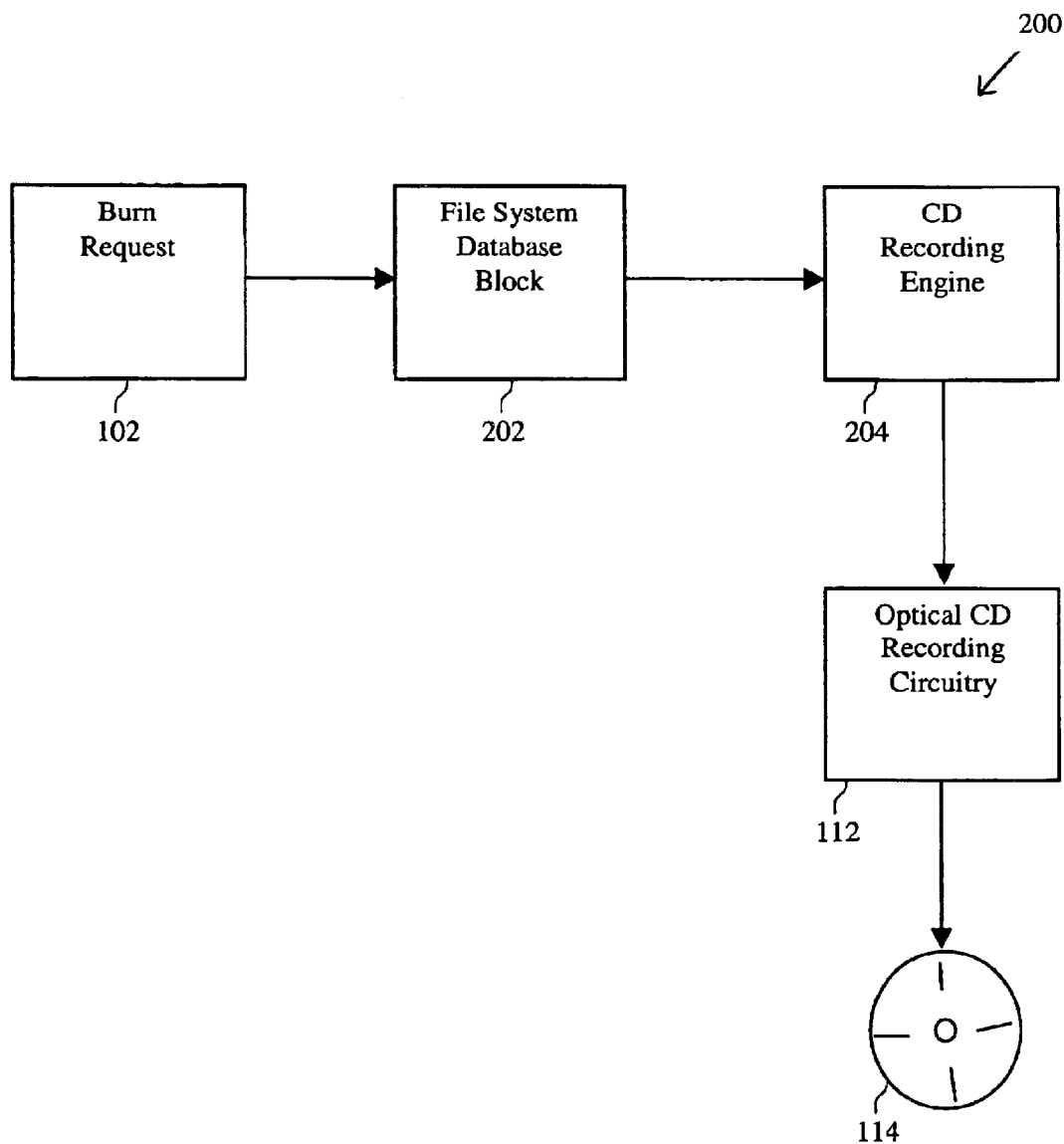
FIG. 2A illustrates a block diagram of the primary operations in preparing data files to be written to an optical disc in accordance with one embodiment of the present invention.

FIG. 2A illustrates a block diagram 200 of the primary operations in preparing data files to be written to an optical disc in accordance with one embodiment of the present invention. The method is applicable to writing data files to any type of optical media (e.g., DVD discs, CD-R discs, CD-RW discs, mini-discs, etc.), and is illustrated by way of example using the common compact disc (CD). The selection of data files to be recorded to CD initiates a burn request 102. The selection of files can be accomplished in any number of ways including, for example, operator input into the system through the graphical user interface (e.g., dragging a set of files to a CD device icon on a computer monitor), or executing a CD read/write software application and in response to a scripted set of queries, the operator selecting a group of one or more data files to be written to a CD optical disc. The burn request 102 is the selection and identification of a group of one or more data files to be copied from their source and written to a CD optical disc.

In the file system database block 202, the data files are examined and processed in order to prepare for the selected data files to be recorded on to a CD optical disc. Several discrete operations occur in the processing of the data files as will be discussed in greater detail below. It should be understood that some of the operations occur simultaneously with others, in various combinations, and some embodiments either eliminate or supplement the examples that are provided below. The file system database block 202 encompasses those various operations that are performed to prepare selected data to be burned to a CD. In one embodiment, the file system database block 202 is a collection of subroutines or other computer code that functions to manipulate the selected data files, performing the functions listed in the exemplary embodiments below in the execution of the software application code that records data to a CD optical disc.

In one embodiment, the processing includes examining each of the data files selected for recording to CD and generating a record data structure for each file. A record data structure is a record of identifying information about one of the data files selected to be recorded to a CD that will enable the writing of the source data file to a destination CD.

One embodiment of a record data structure is illustrated in FIG. 2B. Typical data fields include, as illustrated, the file parent of the data file. This information is used to map the file path to the data file in its destination location in order to locate the file on the destination CD. The volume label index is additional location identification information naming the source volume of the data file. The file size identifies the exact size of the file in bytes (or other suitable units of measure) to be used in calculating and identifying the destination location of the data and in making the determination which files will be sent to system cache memory during the writing operation. Files that are sent to system cache memory are further identified by the location in the system cache memory which holds the data file as described in greater detail below, and the file size is used to calculate that location. The logical block number identifies the destination location by the logical block where the data file will be written. The file time is the most recent modification time of the data file. This provides both the time and the date of the file, and can be used, for example, in both cataloging as well as differentiating between two identically named files. The file source path is the complete path to the data file in order to locate and read the file during the recording operation, and the file attributes include such information as whether the file is a system file, a read-only file, if it is a hidden file, and whether it is an archive file.

Data mode is another field in the record data structure generated by the file system database and illustrated in FIG. 2B. Possible data modes include mode 1 or mode 2, and if the data file is mode 2, whether it is mode 2 form 1 or mode 2 form 2. Data mode provides necessary identifying information about a data file and how it will be cached in system cache memory or written to the destination optical disc. In particular, data mode determines the number of bytes of data and other information that are contained in a sector. Other fields that may be included in the record data structure are whether or not the source data file is located on removable media such as another CD, a data tape, a floppy disk, a disk cartridge (e.g., a Jaz® disk, a Zip® disk, etc.) and the like, whether the data file contains an embedded subheader, and whether or not the selected data file has been written to the destination CD in an earlier session.

FIG. 2B illustrates one embodiment of a typical record data structure. Additional data fields may be supplemented, and some illustrated fields may be deleted according to the configuration of the host system and the CD writing software application. The record data structure provides a list of a data file's location and identifying information, and a record data structure is created for each data file selected to be recorded so that the files selected to be written to an optical disc can be located, arranged, and successfully copied from one or more source locations to a destination CD.

Returning to FIG. 2A, the generating of the record data structures is one of several processes that may occur in the file system database block 202. In another embodiment, the processing of the data files selected for burning to a CD includes determining which of the selected files will be sent to the system cache memory in the process of writing to a CD. As is known, the successful writing of data to a CD requires an uninterrupted flow of data to the optical CD recording circuitry 112 during the recording operation. System cache is filled with data files identified during the processing that occurs in the file system database block 202, and then sent to the optical CD recording circuitry 112 in a steady stream of data during the actual burn.

In still another embodiment, the processing includes the sequencing of the data files in the order in which they will be written to a CD optical disc. As is known, data files are of varying lengths and can be from a single sector to several sectors in length. Additionally, some data files are required to remain in a fixed location relative to other data files, for example, when the data files are part of an executable software application. Sequencing of files maximizes the efficient use of available space and configuration of the destination optical disc, and maintains any required structure the data files may need to execute a desired function or task.

Figure 2C:
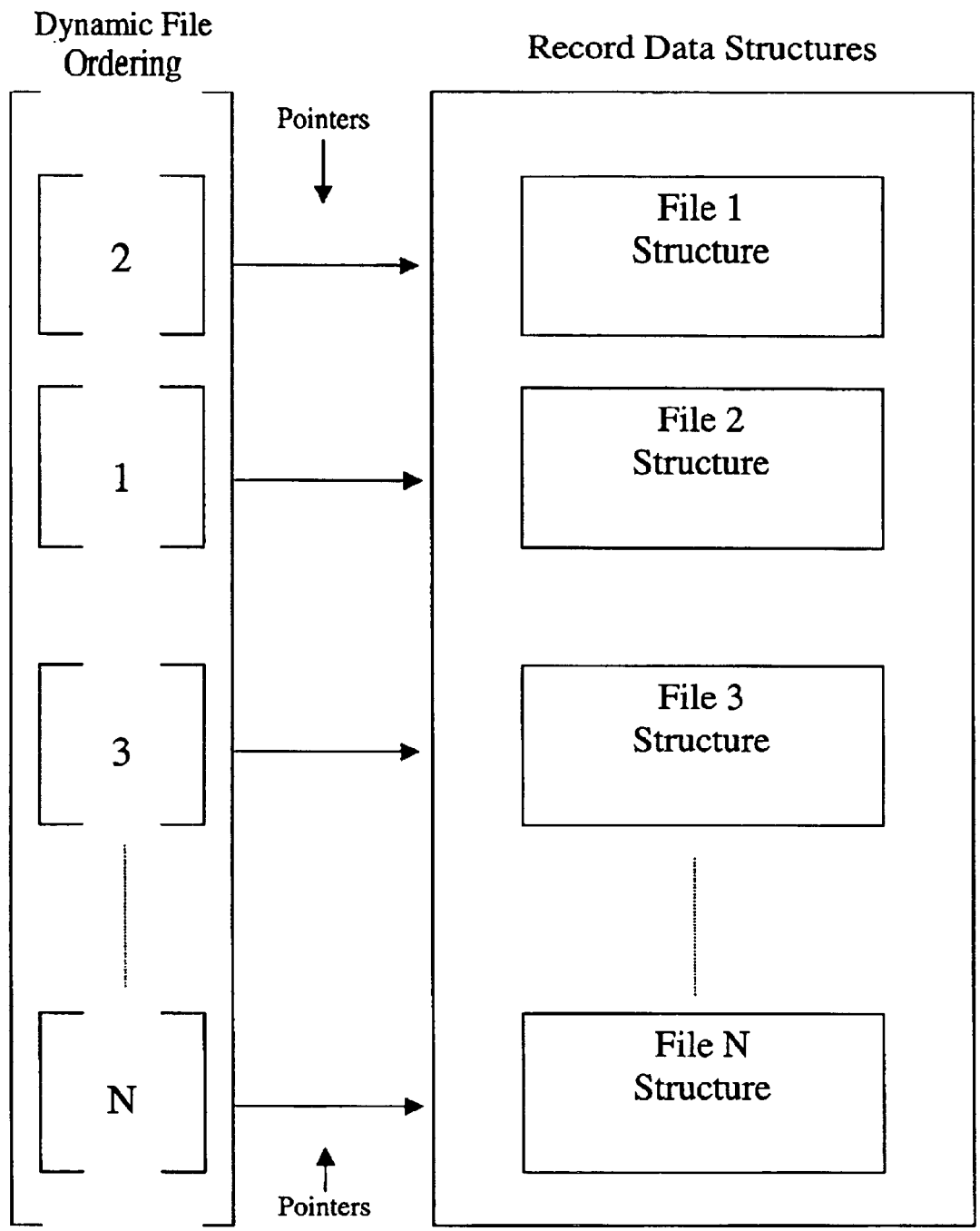
FIG. 2C shows the use of pointers in the dynamic file ordering of record data structures in accordance with one embodiment of the present invention.

One embodiment of the present invention accomplishes the ordering of data files by using pointers to list the data files in an identified sequence. The use of pointers significantly reduces the consumption of system resources in the process of sequencing the record data structures. Typically, the method of sequencing the selected data files for writing to a CD in prior art, involved the complete re-generation of the record data structure or similar list of the data file location and identification information. By using pointers, the record data structure FIG. 2B) is generated only once for each data file selected for recording to CD. As can be seen in FIG. 2C, the record data structures are compiled in the order in which the files were examined. The sequencing, or dynamic file ordering, of the record data structures identifies the order in which the source data files will be written to the destination optical disc. The dynamic file ordering is accomplished through the use of pointers to the record data structures identifying the order in which their associated data files will be written.

Returning again to FIG. 2A, the file system database block performs another task in yet another embodiment of the present invention. The data files selected to be written to CD need to be verified to ensure that they exist in the location reflected in the record data structure, that they can be opened, and that they are of the size that is reflected in the record data structure. In the verification of the data files, the general integrity of the selected data files is verified in preparation to burning the data files to CD.

Before the process of preparing and burning data files to an optical disc proceeds to the CD Recording Engine 204, the record data structures are processed to generate an ordering data structure that will be passed on to the CD recording engine 204. As discussed above, one of the problems with the prior art was with the multiple lists of practically identical information that were generated. Not only were multiple lists generated, but a combined list was unpacked and sent a structure at a time to the CD recording engine where it was then re-assembled before the source data files could be identified, located, and written to CD. This puts a significant burden on system memory resources, and can result in incomplete data transfer, buffer under-run, or system crash. As the storage capacity of optical discs increases, the number of files to be processed to be written to a CD in a single session also increases, and the prior art management of file processing will not be possible. The present invention substantially reduces the consumption of system memory resources by more efficient utilization of a single list or compilation of record data structures, and also by use of pointers to selected data files.

FIG. 3 illustrates a typical ordering data structure in accordance with one embodiment of the present invention. Like the record data structures, one ordering data structure is generated for each data file selected to be written to a CD. The ordering data structure is a record of pointers to a source data file. Once the source data files have been examined, the record data structures generated, and the dynamic ordering of the data files completed, the record data structures are processed to generate an ordering data structure for each data file. The processing is accomplished in the order in which the associated data files will be written to CD. The ordering data structure is a pointer to a source data file, and the ordering data structure is sent to the CD Recording Engine (FIG. 2A, 204) in the writing order.

The ordering data structure illustrated in FIG. 3 shows four exemplary data fields. The first field, the file source path, is the pointer to the source location of the data file. Following the path as listed leads to the data file at its source. The remaining three fields in the ordering data structure are used to locate those files that were cached in system cache memory. For those files, the source path can only point to system cache memory. The file start offset and file end offset identify the exact location in system cache memory of the data file, and the file pad to size is the number of bytes (or other suitable unit of measure) that must be added to a file to complete a sector of storage space. As is known, a file is generally written from the beginning of a sector or logical block. Files, however, are not necessarily the same length as a sector or logical block, and in those circumstances, empty bytes or pad to size are added to a file to complete a sector or logical block. The file pad to size field of the ordering data record identifies that filler space so that the exact location of data can be identified.

Returning once again to FIG. 2A, the ordering data structures are passed from the file system database block 202 to the CD recording engine 204 in the order in which the associated data files will be written to the optical disc. In one embodiment, the CD recording engine 204 then follows the pointers of the ordering data structures and begins reading the data files into the optical CD recording circuitry 112. It is the CD recording circuitry 112 that accomplishes the actual writing or burning of the data files to the optical disc 114.

Figure 4:
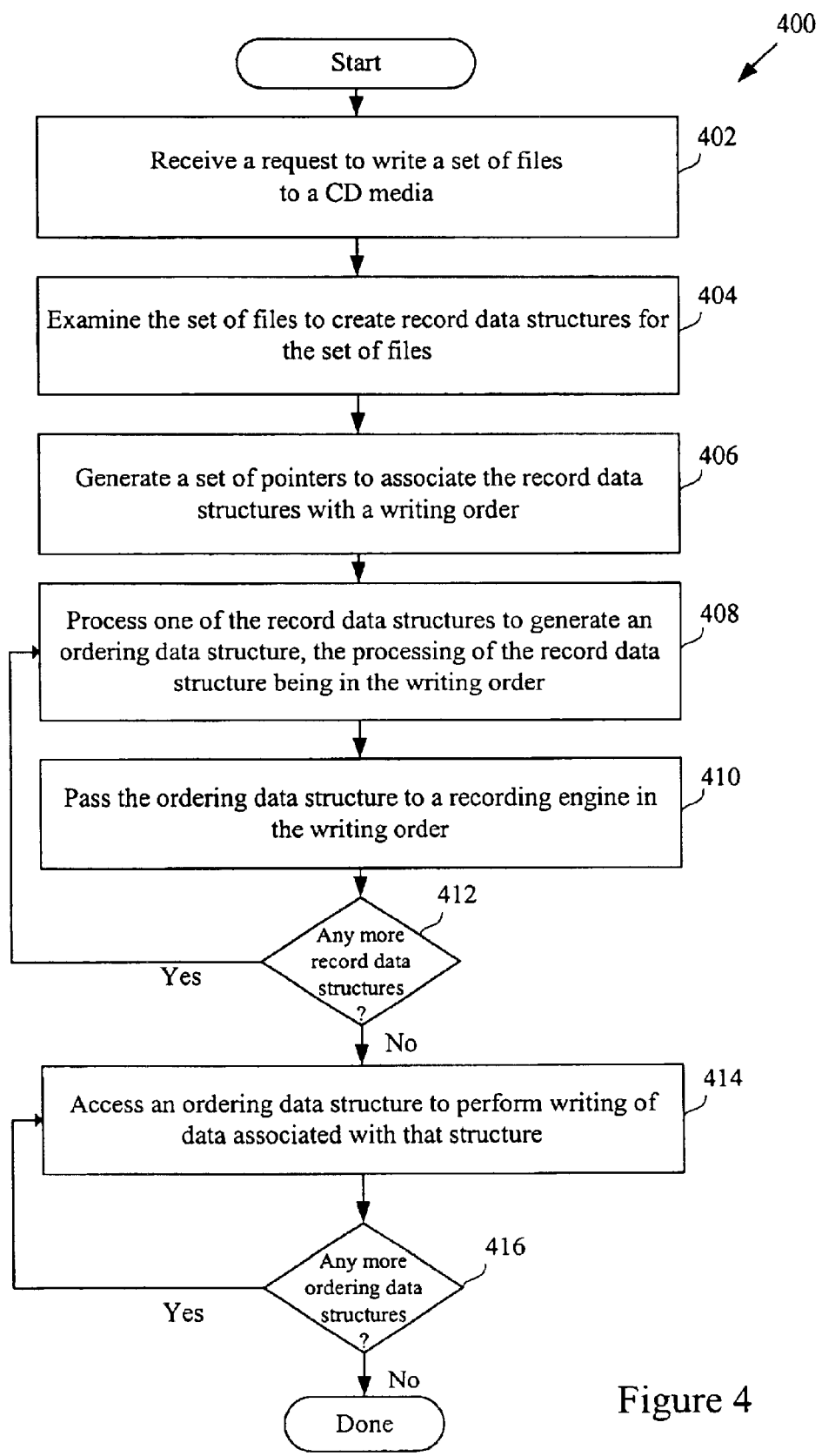
FIG. 4 shows a flowchart diagram illustrating the method operations performed in which data is recorded on an optical disc in accordance with one embodiment of the invention.

FIG. 4 shows a flowchart diagram 400 illustrating the method operations performed in which data is recorded on an optical disc in accordance with one embodiment of the invention. As above, the method is applicable to the recording of files to any optical media, and the CD is used to illustrate by way of example in the following description. The method begins with operation 402 in which a request is received to write a set of files to a CD media. Such a request might occur, for example, when an operator selects a number of data files desired to be recorded on a CD using a graphical user interface, and drags those files to an icon of a CD player/recorder on the computer desktop. In another example, an operator might launch a CD recording program, and in response to a set of queries from the program, select a number of data files to be recorded to a CD optical disc.

The method proceeds to operation 404 in which the files that have been selected for recording are examined and the record data structures for the set of files are generated. The examination of the files includes tracing the complete source path to the desired data file. By way of example, the files may be located on a local hard drive, on a network server, on a remote server accessed through the Internet, or in any location accessible by whatever hardware or physical cabling to the recording system. In addition to the source path, the selected data files are examined to determine their size, when they were created or last modified, the attributes of the selected files, in what data mode they exist, whether or not the selected data files have been written to the CD in a previous session, and other such information as may be required to locate, access, read, write, and identify the selected data records.

The record data structures, as described above and illustrated in FIG. 2B, contain the necessary location and attribute information associated with the data to enable the system to designate the order in which the files will be recorded, to designate which files will be cached to ensure a steady stream of data during recording, and to provide the necessary location information to the CD recording engine. A record data structure is generated for each file selected for recording onto a CD optical disc.

The method next advances to operation 406 where pointers are generated identifying each record data structure in the order in which the corresponding data file will be written to the CD. As discussed above in reference to FIG. 2C, once the record data structures are created, the files can be ordered to maximize the most efficient use of space and system resources in the recording of the data to CD. In one embodiment, the dynamic ordering of the record data structures by pointers obviates the need for additional lists of data files and their source paths which consume considerable system memory resources. The pointers, on the other hand, demand minimal resources, using only about 4 bytes of memory each in a 32-bit operating system. As is known in the operation of burning a CD, a constant flow of data must be maintained. By minimizing the demands on system memory resources caused by multiple generations of lists and tables, using pointers to define the writing order frees system resources to be used where they are most needed.

The method then goes to operation 408 where one of the record data structures is processed to generate an ordering data structure. The processing is accomplished on the record data structure in the order in which the pointers were assigned in operation 406. Thus, the record data structure to be processed is whichever record data structure is next in order according to the pointer assigned. In one embodiment, the processing includes calculating a file start offset and file end offset to a particular location in the system cache memory. The processing also includes calculating a pad to add to a file to complete a sector. Since files are written from the beginning of a logical block, if a file should end somewhere in the middle of a logical block, the pad calculated is how much to add to that file so that the next file will be written starting at the beginning of the very next logical block.

An ordering data structure, as described above in reference to FIG. 3, is a set of pointers to the source data file with additional information providing the recording engine with the exact size and location of the source data file. In one embodiment, the additional information includes the location of a source data file that has been cached so that the recording engine will access the data file from system cache instead of from the original data source. In another embodiment, the additional information includes a pad to size value so that the recording engine knows how many bytes have been added to the data source file to complete a sector. The additional information amplifies the pointers, but the ordering data structures remain a set of pointers. Unlike the record data structures which are lists as described above, the ordering data structures are pointers requiring far fewer system memory resources to store, transfer and process.

Next, the method advances to operation 410 where the ordering data structure is passed to a recording engine in the writing order. Unlike prior art where yet another list would have been generated containing location, size, and other attribute information about each data file, the ordering data structure, in one embodiment of the present invention, provides a set of pointers directly to the data file to be written. The ordering data structure is passed in the order in which the data files will be written to the CD, and requires little or no additional processing by the recording engine.

In decision block 412, the method calls for making a determination as to whether or not any record data structures remain to be processed. If there are record data structures to be processed, the next record data structure in writing order is processed as the method loops back to operation 408. If no record data structures remain, the method advances to operation 414.

In operation 414, the first ordering data structure in writing order is accessed by the recording engine and, following the pointers and location information contained therein, the source file of data is manipulated to be written to the CD. In one example, the source file is located on a host system hard drive. In another example, the source file is located on a remote server. In still another example, the source file is one of group of one or more files that have been cached for steady stream writing of data. Wherever the source file may be located, the recording engine follows the pointers and other location information in the ordering data structure to locate and manipulate the source file for writing to the CD.

In accordance with the response to decision block 416, the method loops through operation 414 until each of the ordering data structures has been accessed and the associated data files written to the CD. When the response to decision block 416 is no, all of the ordering structures have been accessed, resulting in all of the selected data files being written to a CD, and the method is done.

Figure 5:
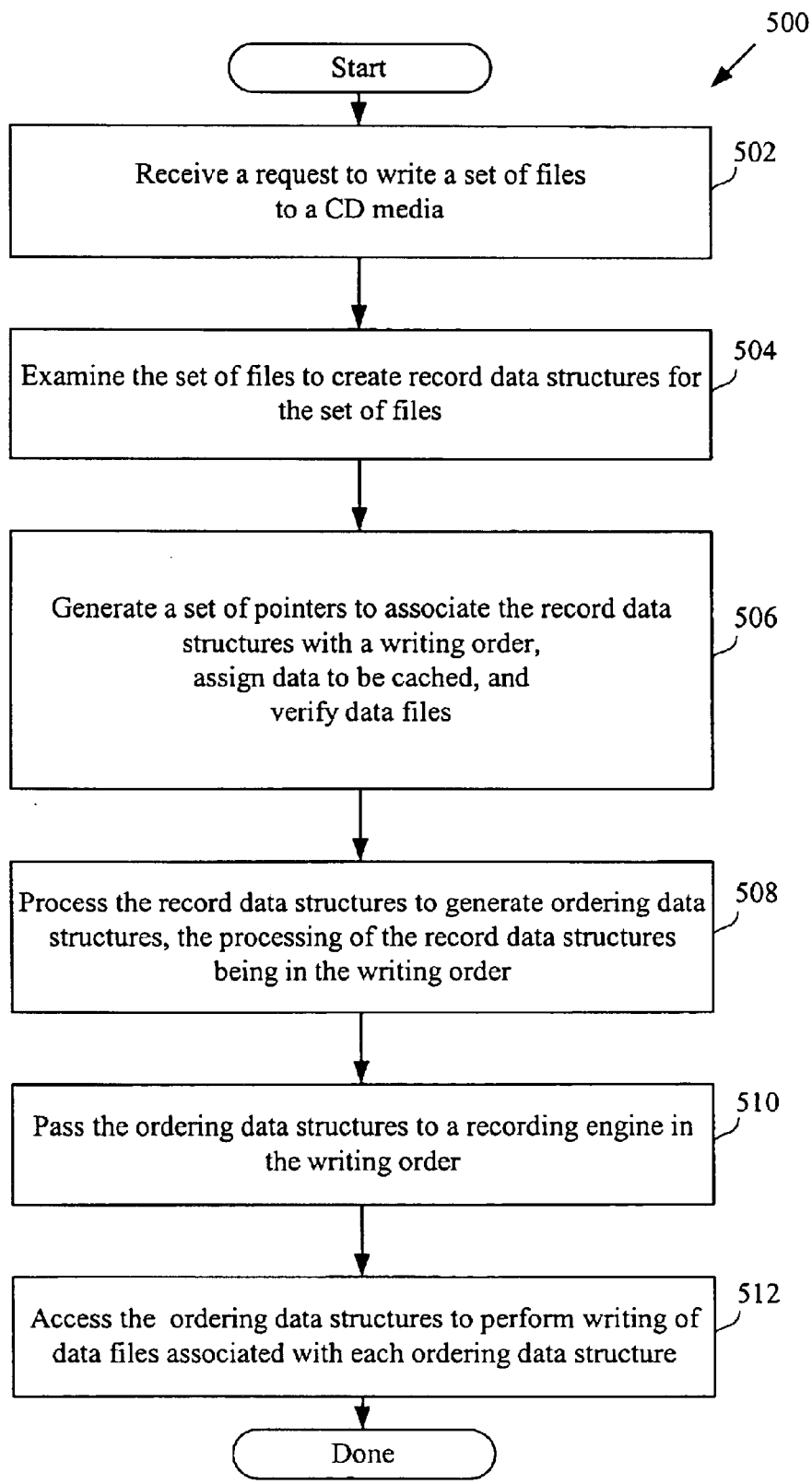
FIG. 5 shows a flowchart diagram illustrating the method operations performed in which data is recorded on an optical disc in accordance with another embodiment of the invention.

FIG. 5 shows a flowchart diagram 500 illustrating the method operations performed in which data is recorded on an optical disc in accordance with another embodiment of the invention. As above, the method is illustrated using the example of burning a CD, but is applicable to any optical media. The method begins with operation 502 in the same manner as the method described in reference to FIG. 4 with a request to write a set of files to a CD media. As above, the request can be in the form of a selected group of data files being dragged to a CD player/recorder icon on a computer desktop, or by selecting a group of one or more data files in response to queries from a CD recording software application.

The method advances to operation 504 where the selected data files are examined by the recording program to create the record data structures as described above and illustrated in FIG. 2B. A record data structure is created for each file selected to be recorded onto the CD optical disc, and provides the location pointers to the source files, file size, data mode, the last time and date the file was updated, and other file attribute information necessary for locating the source file and allocating necessary space and method of recording to write the selected data files onto a CD.

The method proceeds to operation 506 where pointers are generated to arrange the record data structures in an order in which the associated data files will be recorded onto the CD. The order is the writing order, and as described in reference to FIG. 4, pointers are used in the dynamic ordering of the record data structures associated with each of the data files selected to be written to a CD. The use of pointers obviates the generation of yet another list and conserves system resources. As the writing order is generated, those files that will be cached are identified and assigned a specific location in the system cache. As is known, the operation of burning files to a CD requires a constant stream of data while using a great deal of system resources. The caching of data files maximizes the efficient use of available memory and resources, and ensures the steady flow of data to the CD writing circuitry. Further, the file integrity of each of the data files identified in a record data structure is verified to ensure that each file can be opened and can be read.

The method then advances to operation 508 where the record data structures are processed to generate ordering data structures. The record data structures are processed in the writing order that was generated in operation 506. The ordering data structure, as described above and illustrated in FIG. 3, is a set of pointers to the data flies. The ordering data structure points the recording engine to the source data file from where it will be read in the process of writing the file. Thus, if the file has been cached, the ordering data structure points to the exact location in the system cache where the file is located.

The method proceeds to operation 510 and the ordering data structures are passed to the recording engine in the writing order. By passing only the ordering data structures, the method conserves valuable system memory resources. Using the ordering data structures, the recording engine need not generate or compile additional lists or tables as was noted in prior art, and using pointers instead of the entire structure of the record data structure minimizes the amount of system resources required to communicate the necessary information to the recording engine.

In operation 512, the method proceeds to accessing the ordering data structures which have been provided to the recording engine in writing order. The associated data files are burned to the CD in the writing order, and the method is done.

One benefit and advantage of the invention is more efficient and reliable transfer of data files to a CD optical disc. Another benefit is faster turn around time for burning large amounts of data to a CD optical disc by efficient processing as described above.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

The exemplary embodiments described herein are for purposes of illustration and are not intended to be limiting. Accordingly, those skilled in the art will recognize that the present embodiments are to be considered as illustrative and not restrictive, and the invention is not to be limited to the details given herein, but may be modified within the scope and equivalents of the appended claims.

What is claimed is:

1. A method for recording data onto an optical disc, comprising:

generating a set of pointers to associate record data structures with a writing order, the set of pointers defining a dynamically ordered list of record data structures;

processing each of the record data structures one after another in the writing order to produce an ordering data structure for each file in a set of files to be recorded onto the optical disc, each ordering data structure being a record of pointers to a source of data for recording onto the optical disc; and processing each ordering data structure to write the set of files onto the optical disc in the writing order defined by the dynamically ordered list of record data structures.

2. A method for recording data onto an optical disc as recited in claim 1, further comprising:

examining the set of files selected to be recorded onto the optical disc.

3. A method for recording data onto an optical disc as recited in claim 2, further comprising:

creating a record data structure for each file in the set of files to be recorded onto the optical disc.

4. A method for recording data onto an optical disc as recited in claim wherein the record data structure includes one or more of a group of information strings comprising a file parent, a volume label index, a file size, a logical block number of a data file, a file path, a file attributes, a data mode, a removable media indicator, an embedded subheader string, and an imported file indicator.

5. A method for recording data onto an optical disc as recited in claim 3, further comprising:

designating data files to be written to system cache memory;

assigning data files designated to be written to system cache memory to a specific location in system cache memory;

verifying that the record data structures accurately define each of the set of files.

6. A method for recording data onto an optical disc as recited in claim 3, wherein each ordering data structure includes a pointer to a corresponding source file.

7. A method for recording data onto an optical disc as recited in claim 6, wherein the pointer includes at least one a group of information strings referencing the corresponding source file and including a file source path, a file start offset, a file end offset, and a file pad to size.

8. A method for recording data onto an optical disc as recited in claim 3, wherein the processing of the ordering data structures includes passing the ordering data structures to a CD recording engine, the CD recording engine writing the set of files onto the optical disc in the writing order.

9. A method for recording data onto an optical disc as recited in claim 3, further comprising:

receiving a request to write the set of files.

10. A method for recording data onto an optical disc as recited in claim 3, wherein the method is executed by computer executing code that defines a file system database block.

11. A method for processing data to be recorded on an optical disc, comprising:

examining a set of files selected to be recorded on the optical disc;

creating a record data structure for each file in the set of files to be recorded on the optical disc;

generating a set of pointers to associate the record data structures with a writing order, the set of pointers defining a dynamically sequenced list of record data structures;

processing each of the record data structures one after another in the writing order according to the dynamically sequenced list of record data structures to produce ordering data structures for each file in the set of files, the ordering data structures being a record of pointers to a source data file with each file in the set of files having a corresponding ordering data structure; and processing the ordering data structures to write the set of files onto the optical disc in the writing order;

wherein the source data file is a data file in the set of files at a source location from which it is read to be recorded on the optical disc.

12. The method for processing data to be recorded on an optical disc of claim 11, wherein the record data structure includes one or more of a group of information strings comprising a file parent, a volume label index, a file size, a logical block number of a data file, a file path, a file attributes, a data mode, a removable media indicator, an embedded subheader string, and an imported file indicator.

13. The method for processing data to be recorded on an optical disc of claim 11, further comprising:

designating data files to be written to system cache memory;

assigning data files designated to be written to system cache memory to a specific location in system cache memory;

verifying that the record data structures accurately define each of the set of files.

14. The method for processing data to be recorded on an optical disc of claim 11, wherein the record of pointers to a source data file includes one or more of a group of information strings referencing source data files and including a file source path, a file start offset, a file end offset, and a file pad to size.

15. The method for processing data to be recorded on an optical disc of claim 11, wherein the processing of the ordering data structures includes passing the ordering data structures to a CD recording engine, the CD recording engine writing the set of files onto the optical disc in the writing order.

16. The method for processing data to be recorded on an optical disc of claim 11, further comprising:

receiving a request to write the set of files.

17. The method for processing data to be recorded on an optical disc of claim 11, wherein the method is executed by computer executing code that defines a file system database block.

18. A computer readable media having program instructions for recording data onto an optical disc, the computer readable media comprising:

program instructions for examining a set of files selected to be recorded on the optical disc;

program instructions for creating a record data structure for each file in the set of files to be recorded on the optical disc;

program instructions for generating a set of pointers to associate record data structures with a writing order, the set of pointers defining a dynamically sequenced list of record data structures and the writing order being a sequence in which each file in the set of files is to be recorded onto the optical disc;

program instructions for processing each of the record data structures one after another in the writing order according to the dynamically sequenced list to produce an ordering data structure for each file in a set of files, the ordering data structure having a pointer to a source location of a corresponding data file; and program instructions for processing each ordering data structure to write the set of files onto the optical disc in the writing order.

19. A computer readable media having program instructions for recording data onto an optical disc as recited in claim 18, wherein the record data structure includes one or more of a group of information strings comprising a file parent, a volume label index, a file size, a logical block number of a data file, a file path, a file attributes, a data mode, a removable media indicator, an embedded subheader string, and an imported file indicator.

20. A computer readable media having program instructions for recording data onto an optical disc as recited in claim 18, further comprising:

program instructions for designating data files to be written to system cache memory;

program instructions for assigning data files designated to be written to system cache memory to a specific location in system cache memory;

program instructions for verifying that the record data structures accurately define each file in the set of files.

21. A computer readable media having program instructions for recording data onto an optical disc as recited in claim 18, wherein the pointer to the source location includes one or more of a group of information strings referencing the corresponding data file and including a file source path, a file start offset, a file end offset, and a file pad to size.

22. A computer readable media having program instructions for recording data onto an optical disc as recited in claim 18, wherein the processing of each ordering data structure includes program instructions for passing the ordering data structure to a CD recording engine, the CD recording engine writing the set of files onto the optical disc in the writing order.

23. A computer readable media having program instructions for recording data onto an optical disc as recited in claim 18, further comprising:

program instructions for receiving a request to write the set of files.

24. A computer readable media having program instructions for recording data onto an optical disc as recited in claim 18, further comprising:

for defining a file system database block.

* * * * *